United States Patent
Ibing et al.

(10) Patent No.: US 10,628,161 B2
(45) Date of Patent: Apr. 21, 2020

(54) PROCESSOR FOR CORRELATION-BASED INFINITE LOOP DETECTION

(71) Applicant: Technische Universität München, Munich (DE)

(72) Inventors: Andreas Ibing, München (DE); Julian Kirsch, Freising (DE)

(73) Assignee: TECHNISCHE UNIVERSITÄT MÜNCHEN, Munich (DE)

(*) Notice: Subject to any disclaimer, the term of this patent is extended or adjusted under 35 U.S.C. 154(b) by 160 days.

(21) Appl. No.: 15/662,454

(22) Filed: Jul. 28, 2017

(65) Prior Publication Data
US 2018/0032340 A1 Feb. 1, 2018

(30) Foreign Application Priority Data
Jul. 28, 2016 (DE) .................. 10 2016 113 968

(51) Int. Cl.
*G06F 9/32* (2018.01)
*G06F 8/41* (2018.01)
*G06F 9/30* (2018.01)
*G06F 11/07* (2006.01)

(52) U.S. Cl.
CPC .............. *G06F 9/325* (2013.01); *G06F 8/443* (2013.01); *G06F 8/452* (2013.01); *G06F 9/30054* (2013.01); *G06F 9/30065* (2013.01); *G06F 11/0706* (2013.01); *G06F 11/0751* (2013.01)

(58) Field of Classification Search
CPC ..................................................... G06F 9/325
See application file for complete search history.

(56) References Cited

U.S. PATENT DOCUMENTS

2015/0261541 A1* 9/2015 Fiske .................. G06F 9/30181
712/226

FOREIGN PATENT DOCUMENTS

WO    WO 2003048928    6/2003

OTHER PUBLICATIONS

A. Ibing, J. Kirsch and L. Panny, "Autocorrelation-Based Detection of Infinite Loops at Runtime," DASC/PiCOM/DataCOM/CyberSciTech, Auckland, 2016, pp. 368-375. (Year: 2016).*
Ibing et al., "A fixed-point algorithm for automated static detection of infinite loops." *High Assurance Systems Engineering (HASE), 2015 IEEE 16th International Symposium on.* IEEE, 2015.

* cited by examiner

*Primary Examiner* — Keith E Vicary
(74) *Attorney, Agent, or Firm* — Sunstein LLP

(57) ABSTRACT

A processor comprises an execution unit and a detection unit which are functionally connected. The execution unit is configured to execute computer programs, and the detection unit is configured to detect infinite loops during the execution of a computer program in the execution unit during run-time. The computer program has a plurality of go-to instructions, and each go-to instruction is characterized by a corresponding branch address. The detection unit is configured to calculate a detection function of the branch addresses of a branch sequence, the branch sequence including a sequence of executed go-to instructions. The detection function is chosen such that an increased value of the detection function is characteristic of an infinite loop in the branch sequence in which at least one go-to instruction is repeated.

39 Claims, 6 Drawing Sheets

$$R(l, m) = \begin{cases} R(l, m-1) + 1 & \text{for } b(m) = b(m-l) \\ 0 & \text{otherwise} \end{cases}$$

FIG. 1A

| m | b(m) | R(l=1,m) | R(l=2,m) | R(l=3,m) | R(l=4,m) | R(l=5,m) |
|---|---|---|---|---|---|---|
| 1 | 1 | - | - | - | - | - |
| 2 | 2 | 0 | - | - | - | - |
| 3 | 3 | 0 | 0 | - | - | - |
| 4 | 4 | 0 | 0 | 0 | - | - |
| 5 | 5 | 0 | 0 | 0 | 0 | - |
| 6 | 1 | 0 | 0 | 0 | 0 | 1 |
| 7 | 2 | 0 | 0 | 0 | 0 | 2 |
| 8 | 3 | 0 | 0 | 0 | 0 | 3 |
| 9 | 4 | 0 | 0 | 0 | 0 | 4 |
| 10 | 5 | 0 | 0 | 0 | 0 | 5 |
| 11 | 1 | 0 | 0 | 0 | 0 | 6 |
| 12 | 2 | 0 | 0 | 0 | 0 | 7 |
| 13 | 3 | 0 | 0 | 0 | 0 | 8 |
| 14 | 4 | 0 | 0 | 0 | 0 | 9 |
| 15 | 5 | 0 | 0 | 0 | 0 | 10 |
| 16 | 1 | 0 | 0 | 0 | 0 | 11 |

FIG. 1B $$R(l,f,m) = \begin{cases} R(l,f,m-1) & \text{for } f \neq m \bmod l \\ R(l,f,m-1) + 1 & \text{for } f = m \bmod l \text{ and } b(m) = b(m-l) \\ 0 & \text{for } f = m \bmod l \text{ and } b(m) \neq b(m-l) \end{cases}$$

FIG. 2A

| m | b(m) | R($l$=5, f=0,m) |
|---|------|-----------------|
| 1 | 1 | |
| 2 | 3 | |
| 3 | 2 | |
| 4 | 1 | |
| 5 | 5 | 0 |
| 6 | 2 | 0 |
| 7 | 2 | 0 |
| 8 | 1 | 0 |
| 9 | 5 | 0 |
| 10 | 5 | 1 |
| 11 | 2 | 1 |
| 12 | 1 | 1 |
| 13 | 3 | 1 |
| 14 | 3 | 1 |
| 15 | 5 | 2 |
| 16 | 4 | 2 |
| 17 | 2 | 2 |
| 18 | 1 | 2 |
| 19 | 5 | 2 |
| 20 | 5 | 3 |
| 21 | 3 | 3 |
| 22 | 1 | 3 |
| 23 | 2 | 3 |
| 24 | 1 | 3 |
| 25 | 5 | 4 |
| 26 | 4 | 4 |
| 27 | 4 | 4 |
| 28 | 5 | 4 |
| 29 | 3 | 4 |
| 30 | 5 | 5 |

FIG. 2B

| m | b(m) | R($l$=5,f=2,m) | R($l$=5,f=0,m) |
|---|---|---|---|
| 1 | | | |
| 2 | 2 | | |
| 3 | 5 | | |
| 4 | 3 | | |
| 5 | 2 | | |
| 6 | 1 | 0 | 0 |
| 7 | 5 | 0 | 0 |
| 8 | 2 | 0 | 0 |
| 9 | 2 | 0 | 0 |
| 10 | 1 | 0 | 0 |
| 11 | 5 | 0 | 0 |
| 12 | 5 | 1 | 0 |
| 13 | 2 | 1 | 0 |
| 14 | 1 | 1 | 0 |
| 15 | 3 | 1 | 0 |
| 16 | 3 | 1 | 0 |
| 17 | 5 | 2 | 0 |
| 18 | 4 | 2 | 0 |
| 19 | 2 | 2 | 0 |
| 20 | 1 | 2 | 0 |
| 21 | 5 | 2 | 0 |
| 22 | 5 | 3 | 0 |
| 23 | 3 | 3 | 0 |
| 24 | 1 | 3 | 0 |
| 25 | 2 | 3 | 0 |
| 26 | 1 | 3 | 0 |
| 27 | 5 | 4 | 0 |
| 28 | 4 | 4 | 0 |
| 29 | 2 | 4 | 0 |
| 30 | 1 | 4 | 0 |
| 31 | 3 | 4 | 0 |
| 32 | 5 | 5 | 0 |
| 33 | 2 | 5 | 0 |
| 34 | 1 | 5 | 0 |
| 35 | 2 | 5 | 0 |
| 36 | 1 | 5 | 0 |
| 37 | 5 | 6 | 0 |

Fig. 3

PROCESSOR FOR CORRELATION-BASED INFINITE LOOP DETECTION

FIELD OF THE INVENTION

The present invention relates to the detection of infinite loops of a computer program, and in particular to a processor and a method for detecting infinite loops during the execution of a computer program during its run-time.

PRIOR ART

A computer program consists of a sequence of instructions that are executed by a computer, usually to solve specific problems. An execution of the instructions in the order specified in the program code is often not sufficient for processing the problem to be solved. Frequently, the execution of the computer program must be continued at a location which, according to the regular flow sequence of the computer program, precedes that of the instruction currently being executed. For example, multiple runs of a section of the computer program, for example a subroutine, may be necessary in order to solve a problem. Therefore, computer programs contain instructions known as go-to instructions or "jump instructions", which cause jumps between locations of the computer program, i.e. between instructions.

The instructions of a computer program are characterized by corresponding memory addresses, which correspond to values of the so-called program counter, or PC for short, or instruction counter. The program counter is a special register within a processor, e.g. a CPU, of a computer that contains the memory address of the current or next instruction to be executed, in the form of a counter value. If an instruction has been successfully executed, the execution of the program is continued with the next instruction: the processor reads the next instruction from the memory address specified in the instruction counter, increases the counter value and executes the instruction.

In the case of a go-to instruction, the counter value is not increased but replaced by the appropriate counter value. The memory address of the current go-to instruction is designated as the "source branch address" or "jump source address", while the memory address of the go-to instruction to be executed next is designated as the "target branch address" or "jump destination address". In the case of a go-to operation to which it is intended to return (e.g. the invocation of a subroutine or function), the current counter value is stored in a specific register or memory and the processing is continued at the starting memory address of the subroutine. After the termination of the subroutine the counter value is reset to the previous value and the execution is therefore continued at the original location of the "interrupted" computer program.

The controlled repeated execution of a part of the computer program, possibly subject to the precondition that a predefined condition is met, is also designated as a loop. The sequence of go-to instructions of a computer program that occur for solving the corresponding problem forms the branch sequence or "jump sequence" thereof. The branch sequence of a computer program therefore consists of the go-to instructions to be executed, that typically comprise numerous jumps between different locations of the sequence of instructions in the program code, as well as loops and branching points.

Incorrectly designed branch sequences can cause unintended repetitions of go-to instructions ad infinitum, which are not foreseen in the regular course of the computer program. Such an uncontrolled loop is also called an infinite loop. An infinite loop may for example occur when the abort criterion of a loop is incorrectly formulated, or when the structure of the go-to instructions is accidentally designed in such a way that the execution of the computer program runs into an iteration which never reaches a termination condition. This causes an unwanted waste of computing resources that may cause, for example, the slowing down of parallel running processes.

In addition, an infinite loop represents a security bug. A computer program which has run into an infinite loop can cause the system to hang or even a complete system crash. For this reason a computer program which is vulnerable to infinite loops is susceptible to so-called denial of service attacks, which could exploit the overloading of the system caused by an infinite loop.

In addition, computer programs are often an integral part of automated systems in which such errors can have disastrous results, for example in the case of cardiac pacemakers, flight and vehicle control systems, and nuclear reactor monitoring systems.

In view of the negative consequences of an uncontrolled infinite loop, methods for improved infinite loop detection are the subject of ongoing research in the field of software engineering. Ideally, an infinite loop detection method should be able to detect all possibly occurring infinite loops in a limited run-time, without producing false alarms. A perfectly infallible detection method for infinite loops does however not exist, however. In reality, a compromise must be found between the risks of positive or negative detection errors and the run-time required.

So-called "watchdog" infinite loop detection methods are based on monitoring the progress of a computer program over time. If a computer program no longer periodically indicates that it is running correctly, and/or if the run-time of the computer program exceeds a pre-set threshold, a corresponding response is initiated, for example, a notification to the user or the termination of the process in question. However, the setting of a default time limit for the execution of a computer program is to some extent arbitrary and proves to be impractical for many infinite loops.

A second conventional approach for testing computer programs is based on so-called interactive theorem provers, such as so-called "Satisfiability Modulo Theory tests" (SMT tests). In this method, it is checked whether the path conditions of two consecutive loop iterations accumulated by multiple executions of a loop constitute a tautology, i.e. a logical formula which is always true regardless of the values taken by the variables. A path condition is composed of all the conditions that cause a certain part (or path) of a computer program to be executed. If the set of all conditions of the path condition of a loop corresponds to a tautology, the necessary conditions for the execution of the loop are always fulfilled, so that the loop is an infinite loop. However, the use of interactive theorem provers requires the symbolic representation of the path condition, which turns out to be too computationally intensive and complicated in practice. Consequently, such methods are usually unsuitable for detecting infinite loops of a computer program during its run-time.

A third option which is used in conventional infinite loop detection methods is to assign a hash value to each execution state of the computer program, which can comprise, for example, register and memory contents. After each go-to instruction the corresponding hash value for the execution state of the computer program is compared with the previous hash values. The repeated occurrence of a hash value is interpreted as an indicator of an infinite loop. This requires however the presence of sufficient storage space for keeping track of the historical series of the preceding hash values.

Furthermore, in the semi-conductor industry there is increasing interest in hardware-implemented systems for real-time detection of bugs such as infinite loops. Hardware-implemented solutions can be used to relieve the load on a main processor (for example the CPU) and thus contribute substantially to hardware acceleration. At present however, the infinite loop detection methods known from the prior art do not offer any completely satisfactory solution which, given the increasing complexity of computer programs and processors required by the development of the market, is compatible with the real-time detection of infinite loops.

Thus, a need for improvement exists in the real-time detection of infinite loops in terms of accurate and reliable detection methods, in particular methods that are simple enough to enable a hardware implementation.

DESCRIPTION OF THE INVENTION

The problem addressed by the present invention is to detect an infinite loop in the execution of a computer program during its run-time. This problem is solved by a processor according to claim 1, a method according to claim 22, and a computer-readable storage medium according to claim 39. An infinite loop is defined in this context as a sequence of go-to instructions, of which one or more go-to instructions are executed repeatedly without this being intended in the normal execution of the computer program. Advantageous embodiments and extensions of the invention are specified in the dependent claims.

The processor of the invention comprises an execution unit and a detection unit that are functionally connected, wherein the execution unit is configured to execute computer programs, and wherein the detection unit is configured to detect infinite loops during the execution of a computer program in the execution unit during the run-time of the computer program. The computer program comprises a plurality of go-to instructions, wherein each go-to instruction is characterized by a corresponding branch address. The detection unit is configured to calculate a detection function of the branch addresses of a branch sequence, wherein the branch sequence comprises a sequence of executed go-to instructions. The detection function according to the invention is chosen such that an increased value of the detection function is characteristic of an infinite loop in which at least one go-to instruction is repeated. The term "detection" function is to be interpreted broadly in this disclosure, so that the invention includes every possible formulation which is capable of indicating an infinite loop by means of an increased value. In other words, the detection function is a function which assumes a higher value in the event of the existence of an infinite loop than when no infinite loop is present.

The detection function is a function of branch addresses of the branch sequence of the computer program being analysed. In particular, the branch addresses can be either source branch addresses or target branch addresses.

The detection unit may comprise, for example, logical circuits that are suitable for detecting infinite loops in accordance with the invention. The simple mathematical structure of the detection analysis of the processor of the invention enables a simplified architecture of the detection unit and therefore of the entire processor. In particular, the processor according to the invention has the advantage that the monitoring of a computer program executed in the processor can be carried out automatically within the processor. Therefore the execution of the detection analysis does not require any software-based platform, for example no source code. Transferring the computational tasks associated with the real-time detection of infinite loops to the detection unit as specified according to the invention relieves the execution unit of these tasks, so that the actual execution of computer programs is not slowed down by the detection of infinite loops at run-time.

Further, the calculation of the detection function in the context of the present invention is not limited to a direct mathematical calculation, rather the "calculation" of the detection function may correspond to the identification of a value, for example in the form of a signal amplitude or a logical state. The value identified by the detection function provides information on whether a potential infinite loop is being executed. The detection function in the sense of the invention is therefore any function that can take go-to instructions as a function argument, and which can be implemented in such a way that in the event of periodically repeated execution of the go-to instruction in the function argument, which is characteristic of an infinite loop, the detection function assumes an increased value. In particular, the recognition feature may correspond to an autocorrelation function.

The detection of infinite loops according to the invention is based on the calculation of a detection function of a branch sequence. Such a function enables the execution of the branch sequence of a computer program to be constantly monitored during the run-time of the same and the presence of an infinite loop to be determined in a little computationally intensive manner. In particular, the use of the detection function according to the invention results in that the processor of the invention, unlike conventional systems for detecting infinite loops, does not require the computationally intensive use of logical availability tests, hash value functions or source code.

In a preferred embodiment, the processor according to the invention is also configured to compare the detection function with a threshold value in order to detect the existence of an infinite loop, wherein the existence of an infinite loop is detected if the detection function exceeds the threshold value. This threshold may preferably be varied during the run-time of the computer program.

Consequently, the existence of a potential infinite loop is not assumed if the detection function merely assumes an "increased value", but only if the detection function assumes a value that is greater than the threshold value. In this way the processor can acquire a tolerance for repetitions of go-to instructions that are not detected as infinite loops. The size of this tolerance can be adjusted by means of the threshold value. The accuracy of the detection is thereby improved by not recognizing as infinite loops potential ones which are actually none. For example, the threshold value can be set so that an infinite loop is detected only if the at least one go-to instruction is periodically repeated at least a predetermined number of times. Furthermore, the threshold value can be set so that periodic repetitions of go-to instructions that are provided for in the normal execution of the computer program are not detected as an infinite loop.

In addition, during the run-time of the computer program or between two utilizations of the processor, the threshold value may be varied, so that the tolerance of the processor may be adapted, for example, to the complexity or the computational requirements of the computer program. This allows, for example, setting a higher threshold during the execution of a section of the branch sequence in which the branching options are more numerous, or where the regular execution of the computer program provides an increased number of loops. Conversely, during the execution of a section of the branch sequence having a lower degree of complexity, a lower threshold value may be set. This also allows a more efficient, demand-oriented usage of the available computer resources that may only be used to their full extent if they are required due to the increased complexity of the branch sequence to be executed.

In a preferred embodiment, the detection function depends on an integer l which represents a correlation length, wherein the detection function is chosen such that an increased value of the detection function for a given correlation length l is characteristic of an infinite loop in the branch sequence, in which at least one go-to instruction is repeated at least every l go-to instructions. In this way, the detection analysis of the detection unit may be selectively limited to infinite loops that have a particular correlation length. This has the advantage that the accuracy of the detection analysis and the utilization of the available computer resources may be influenced not only by the choice of the threshold value (as explained above), but also by the choice of the length of the infinite loops to be detected. This facilitates a more efficient and more specific adaptation of the operation of the detection unit to the characteristics of the computer program running in the execution unit.

If a specific correlation length is set, the detection unit only detects infinite loops which comprise a number of go-to instructions corresponding to the correlation length. In combination with the choice of the threshold value, the choice of the correlation length enables that an infinite loop be detected only if a go-to instruction has been repeated at least a predetermined number of times every l times, where l is the correlation length.

According to a preferred embodiment, the detection unit is configured to calculate a detection function which further depends on an integer m, where m is the number of the go-to instructions executed by the computer program.

In a preferred embodiment, the detection unit is configured to calculate a detection function comprising a sum of correlation values, wherein a correlation value is or corresponds to a number that is assigned to a pair of branch addresses of the branch sequence. A "correlation value" within the meaning of this disclosure is a value that provides information about the extent to which the two branch addresses of the pair are similar. A correlation value is however not limited to being a simple numerical value, but may rather be any arbitrary type of measurable quantity that corresponds to a number, i.e. one that may be uniquely associated to a number. In particular, a correlation value may correspond to a signal amplitude or a logical state.

Preferably, a higher correlation value, in particular a correlation value of 1, is assigned to a pair of branch addresses if the branch addresses are identical. If the branch addresses are not identical, the pair of branch addresses is assigned a lower correlation value, in particular a correlation value of 0. This allows the value of the detection function to be based on a binary algorithm, which enables a simple, less computationally intensive real-time detection of infinite loops. In particular, this simplifies the architecture of the processor.

In a preferred embodiment, the increased value of the detection function is characteristic of an infinite loop, in which at least one go-to instruction of the branch sequence is periodically repeated at least once every l go-to instructions. This has the advantage that the detection of infinite loops may be adapted to periodic repetitions of a branch sequence or of a section thereof. This allows non-periodic repetitions of go-to instructions to be selectively excluded from the detection.

In a preferred embodiment the detection unit is configured to calculate the detection function R(l,m) in accordance with the formula $$R(l,m) = \Sigma_{n=1}^{m} \delta(b(n), b(n-l)) \quad (1)$$

where m, n, and l are integers, b(n) and b(n−l) represent the branch addresses of the n-th and the (n−l)-th executed go-to instruction respectively, and where δ is a Kronecker delta function, for which the following is true:

$$\delta(i, j) = \begin{cases} 1 \text{ for } i = j \\ 0 \text{ for } i \neq j \end{cases}.$$

Therefore, the detection function for a specific value of the correlation length l consists of a sum of correlation values of pairs of branch addresses {b(n), b(n−l)}, which are separated according to the order of the corresponding branch sequence by a number of branch addresses corresponding to the correlation length l. As a consequence of the use of the Kronecker delta function as a measure of the correlation values, the correlation value of a pair is either 0 or 1. If the branch address b(n) corresponds to the branch address b(n−l), i.e. if the branch addresses b(n) and b(n−l) are equal, then the pair consisting of these will be assigned a correlation value of 1. Otherwise, i.e. if the branch addresses b(n) and b(n−l) are not equal, then the pair will be assigned a correlation value of 0.

The result of this is that the value of the detection function only increases, namely by 1, if a branch address b(n) of a go-to instruction of the branch sequence, which consists of m go-to instructions, is equal to the branch address of a go-to instruction that was executed l go-to instructions earlier. The value of the detection function therefore increases with each identified repetition of a go-to instruction having the correlation length l. The detection function thus defined may also be designated as autocorrelation function.

In a preferred embodiment the detection unit is configured to calculate the detection function recursively from a preceding detection function, wherein a preceding detection function is the detection function of a preceding branch sequence.

The recursive calculation according to the invention of the detection function has the advantage that the detection unit may calculate the detection function for the current branch sequence from the correlation function corresponding to the immediately preceding branch sequence, namely the branch sequence before the execution of the last executed go-to instruction. Consequently, neither the entire historical sequence of values of the detection function, which change after the execution of each individual go-to instruction, nor the entire historical sequence of go-to instructions need to be taken into account. Instead, to calculate the current correlation function it is sufficient to know a number of go-to instructions of the current branch sequence that corresponds to the correlation length. In this way the computing requirements and the memory requirements for detecting infinite loops of a computer program during its run-time can be substantially reduced.

In a preferred embodiment the detection unit is configured to calculate the detection function R(l,m) recursively from the previous detection function R(l,m−1) according to the formula $$R(l,m) = R(l,m-1) + \delta(b(m), b(m-1)) \quad (2)$$

where $R(l,m-1)$ is the detection function of the immediately preceding branch sequence, $b(m)$ is the branch address of the last executed go-to instruction, and $b(m-l)$ is the branch address of the go-to instruction that was executed a number of go-to instructions before the last executed go-to instruction, said number corresponding to the correlation length, and where $\delta$ is a Kronecker delta function, for which the following is true:

$$\delta(i, j) = \begin{cases} 1 & \text{for } i = j \\ 0 & \text{for } i \neq j \end{cases}.$$

This embodiment enables infinite loops to be detected in which at least one go-to instruction is repeated periodically every l go-to instructions, where l is the correlation length. In particular, this enables infinite loops to be detected in which at least one section of the branch sequence, which consists of a plurality of go-to instructions, is repeated periodically every l go-to instructions.

In a preferred embodiment, the detection function is chosen such that, during execution of a go-to instruction which interrupts the repetition of the at least one go-to instruction, it assumes an output value, in particular a value of 0. The regular repetition of a branch address indicates the presence of an infinite loop. This is indicated by the detection function as stated above, by its value increasing with additional iterations of an already repeated branch address. A sufficient number of repetitions may possibly result in the threshold value with which the detection function is compared being exceeded, and therefore in an infinite loop being detected. Setting the detection function to an output value when a branch address of a go-to instruction interrupting the periodic repetition of the at least one section of the branch sequence occurs results in the detection function not increasing due for instance to a longer run-time only instead of to to an actually existing periodicity in the go-to instructions owing to an infinite loop.

Preferably, the detection function $R(l,m)$ is calculated recursively from the correlation function $R(l,m-1)$ according to the formula $$R(l, m) = \begin{cases} R(l, m-1) + 1 & \text{for } b(m) = b(m-l) \\ 0 & \text{otherwise} \end{cases}. \quad (3)$$

Thus, during the execution of each go-to instruction it is checked whether the periodic repetition of go-to instructions is maintained every l go-to instructions, where l is the correlation length. If this is the case, the value of the immediately preceding detection function may be incremented by 1 and assumed. Otherwise, the value of the detection function is set to 0 if the periodic repetition of go-to instructions every l go-to instructions is interrupted. In this way the interruption of a potential infinite loop in which at least one section of the branch sequence, which consists of a plurality of go-to instructions, is repeated periodically every l go-to instructions, may be detected. If this happens, the value of the detection function is set to 0 so that the false detection of the interrupted loop is avoided.

In a preferred embodiment, the detection unit is configured to calculate a detection function $R(l,f,m)$, which additionally depends on an offset coefficient f, wherein the detection function $R(l,f,m)$ is calculated recursively from the detection function $R(l,f,m-1)$ according to the formula $$R(l, f, m) = \begin{cases} R(l, f, m-1) & \text{for } f \neq m \bmod l \\ R(l, f, m-1) + 1 & \text{for } f = m \bmod l \text{ and } b(m) = b(m-l), \\ 0 & \text{for } f = m \bmod l \text{ and } b(m) \neq b(m-l) \end{cases} \quad (4)$$

where $R(l,f,m-1)$ is the detection function of the immediately preceding branch sequence, $b(m)$ the branch address of the last executed go-to instruction, and $b(m-l)$ the branch address of the go-to instruction which was executed a number of go-to instructions before the last go-to instruction, said number corresponding to the correlation length. Here "mod" designates the modulo function, which indicates the remainder of an integer division (for example, 12 mod 5=2).

This way, the processor may detect the interruption of a potential infinite loop in which at least one go-to instruction is repeated periodically every l go-to instructions, where l is the correlation length, even if varying go-to instructions are executed between the iterations of the repeated go-to instruction. If such an interruption occurs, the value of the detection function is set to 0 so that the false detection of the interrupted loop is avoided. It is understood that the detection function may in other embodiments be set to another predefined output value, which in this disclosure is also designated as a "base value", instead of the value being set to 0.

In a preferred embodiment, the detection unit is configured to calculate the detection function for different values of the correlation length l, wherein the different values of the correlation length l are between 1 and a maximum correlation length L, wherein the value of the maximum correlation length L may preferably be varied during the run-time of the computer program. In this way, the set of the infinite loops to be detected may be extended to a plurality of possible correlation lengths. The search for infinite loops may be adapted to the computational requirements or the degree of complexity of the computer program by adjusting the correlation length and the maximum correlation length. Since an infinite loop necessarily has a positive length, a correlation length of 0 may be ignored.

In a preferred embodiment, the detection unit is configured to calculate the detection function for different values of the offset coefficient f, wherein for a value of the correlation length l the different values of the offset coefficient f are between 0 and l-1. In this way the set of the infinite loops to be detected may be extended to a plurality of possible offset coefficients. This allows the detection of infinite loops in which at least one go-to instruction is repeated periodically every l go-to instructions, regardless of the point of the branch sequence at which the infinite loop occurs, i.e. regardless of when the first execution of the repeating go-to instruction takes place. In particular, in this way an infinite loop can be detected regardless of whether the position of the first repeated go-to instruction in the branch sequence corresponds to a multiple of the correlation length.

If, for example, a periodic repetition of a go-to instruction in which the repeating go-to instruction is repeated every 10 go-to instructions occurs from the fifth go-to instruction of the branch sequence of the computer program, such an infinite loop could be detected by a detection function R(l=10,f=5,m). However, a detection function with this choice of parameters would not detect an identical infinite loop, if this did not occur from the fifth go-to instruction of the branch sequence, but for example from the seventh go-to instruction of the branch sequence. In this case a detection function R(l=10,f=7,m) would be suitable for detecting the infinite loop according to the invention.

The possibility of varying the value of the maximum correlation length L during the run-time of the computer program allows setting a higher value of the correlation length and/or the maximum correlation length, for example, during the execution of a section of the branch sequence in which the branching possibilities are more numerous or in which the execution of loops of a certain length is foreseen according to the normal execution of the computer program. Similarly, during the execution of a section of the branch sequence that has a lower degree of complexity, a lower value of the correlation length and/or the maximum correlation length may be set. This allows for a more efficient, demand-oriented usage of the available computer resources, which may possibly be used to their full extent only when they are required due to the increased complexity of the branch sequence to be executed. Since the value of the maximum correlation length L also determines the maximum value of the offset coefficient f, when adjusting the maximum correlation length L the set of the infinite loops to be detected is extended not only in relation to the length of the loop, but advantageously also in relation to the possible offset of the infinite loop.

In a preferred embodiment, the detection unit is configured to signal the existence of an infinite loop to the execution unit upon detection of said infinite loop, wherein the signalling preferably comprises the transmission of information about the correlation length l and/or information about the go-to instruction at which the infinite loop was detected, or the branch address b(m) thereof. In this case the term "signalling" refers to the generation of a signal that can be received by an external device or an external signal processing system, so that response measures can be initiated upon the detection of an infinite loop if necessary. For example, the detection of a continuous loop can be notified to an operating system running on the processor. If information about the correlation length l and/or about the branch address b(m) of the go-to instruction at which the infinite loop was detected is transmitted, the operating system may respond selectively to the detection of the infinite loop and may process, abort, or interrupt the computer program being executed in the execution unit at the relevant point.

According to a preferred embodiment the execution unit is also configured to carry out a logical satisfiability test in order to check the authenticity of an infinite loop detected by the detection unit, wherein the logical satisfiability test is preferably an SMT test (Satisfiability modulo theory) test. In this way, the authenticity of a supposed infinite loop can be tested. In particular, the test may precede a possible signalling to the execution unit, so that the presence of an infinite loop will be signalled if it has passed the SMT test. This way, detection errors resulting from a specific choice of parameters can be avoided. In particular, too low a threshold can lead to apparent infinite loops being detected and possibly signalled prematurely. In the event that an infinite loop is found to be falsely detected based on the satisfiability test, the threshold value may for example be increased. This has the advantage that an increase in the threshold value can be carried out only when required, and—in some embodiments—automatically. The logical satisfiability test may also be carried out by a piece of software running on the processor or an operating system running in the processor.

In a preferred embodiment, the execution unit is configured to interrupt or abort the execution of the computer program upon the detection of an infinite loop by means of the detection unit.

According to a preferred embodiment, the execution unit or the detection unit is further configured to determine the frequency of execution of at least one go-to instruction of the branch sequence, wherein the detection function is calculated by the detection unit only if the execution frequency of the at least one go-to instruction exceeds a predetermined adjustable threshold value S. In this way, the computationally intensive calculation of detection functions may be avoided, provided a number of repetitions of a go-to instruction exceeding the predetermined threshold value S is not detected. The mere determination of the execution frequency of at least one go-to instruction is usually much less computationally intensive than the detection of infinite loops. By means of such a previous determination of the execution frequency, the activation or the operation of the detection unit may be based upon a reasonable suspicion of the presence of an infinite loop. The calculation of the detection function is only carried out by the detection unit if the previous frequency analysis indicates the possible existence of an infinite loop. This results in a more efficient, demand-oriented utilization of the available computer resources.

In a preferred embodiment, the detection unit also includes a memory which is configured to store the values of one or more of the function parameters of the detection function l, m, n, f, L and F, and the threshold value and/or values of the detection function. This is advantageous for the parallel or sequential execution of multiple computer programs in the execution unit, since the corresponding function parameters and the threshold value and/or the values of the detection function may be stored in the memory, wherein it is possible to store different values of a function parameter for each different computer program being executed. For example, go-to instructions associated with two different computer programs may be executed alternately, wherein a correlation length l=5 proves to be the most suitable for one of the computer programs, while a correlation length l=12 is the optimal choice for the other computer program. In this case, both correlation lengths may be stored in the memory, so that the detection unit can retrieve the appropriate values for the detection analysis of one or the other of the computer programs. The same applies to any number of computer programs, function parameters, threshold values and values of the detection function.

Further, it is possible for the detection unit to write the stored function parameters, threshold values and values of the detection function to the memory and read them from the memory, so that, for example, in the event of a change in a function parameter during the run-time of a computer program, the detection unit may write the new value of the function parameter to the memory. Furthermore, a relevant function parameter may be read directly from the memory after detection of an infinite loop. This has the advantage that in the event of detection of an infinite loop, its correlation length does not need to be determined retrospectively, because it may be simply read from the memory, for example to be signalled to the execution unit. The same applies to any number of computer programs, function parameters, threshold values and values of the detection function.

In a preferred embodiment, the memory or an additional memory which is functionally connected to the execution unit is configured for storing branch addresses. In particular, the execution unit may be configured to write branch addresses in the memory or the additional memory, so that these can be taken into account for the detection in the detection unit. Such a memory is preferably a fast cache memory, e.g. a memory address register or a memory buffer register.

According to a preferred embodiment, an instruction set is assigned to the processor, comprising instructions for reading and/or writing values of at least one of the function parameters l, m, n, f, L and F, and/or the threshold value and/or values of the detection function. The instruction set may form a processor interface, which provides access to the function parameters and values of the processor according to the invention to a piece of software running on the processor, in particular an operating system, so that these may be written and/or read by the software or the operating system.

The invention also relates to a method for detecting infinite loops in the execution of a computer program during the run-time of the computer program, wherein the computer program comprises a plurality of go-to instructions, wherein the method comprises the calculation of a detection function of the branch addresses of a branch sequence, wherein the branch sequence comprises a sequence of executed go-to instructions, wherein the detection function is chosen such that an increased value of the detection function is characteristic of an infinite loop in which at least one go-to instruction is repeated.

In preferred embodiments, the method also comprises steps that correspond to any of the functionalities of the embodiments described above of the processor according to the invention, which are specified in the attached claims. In particular, the method according to the invention may comprise steps in which the detection function or its calculation, as well as the detection and/or signalling of an infinite loop, correspond to the functionalities of the above described embodiments of the processor according to the invention.

The invention also relates to a computer program product comprising a software code for executing the method in accordance with one of the above described embodiments. Any processor may therefore be configured to execute the method according to the invention by means of such a computer program product.

The invention further relates to a computer-readable storage medium that stores the above described computer program product.

BRIEF DESCRIPTION OF THE DRAWINGS

FIG. 1 shows the implementation of one embodiment of the method according to the invention for detecting an infinite loop, in which one section of the branch sequence is repeated periodically.

1A shows the formula according to which the detection function is calculated.

1B shows the values of the detection function for different correlation lengths.

FIG. 2 shows the implementation of one embodiment of the method according to the invention for detecting an infinite loop, in which one go-to instruction is repeated periodically.

2A shows the formula according to which the detection function is calculated.

2B shows the values of the detection function for a correlation length l=5 and an offset coefficient f=0.

FIG. 3 shows the implementation of the embodiment of FIG. 2 for different values of the offset coefficient.

Figure 4:
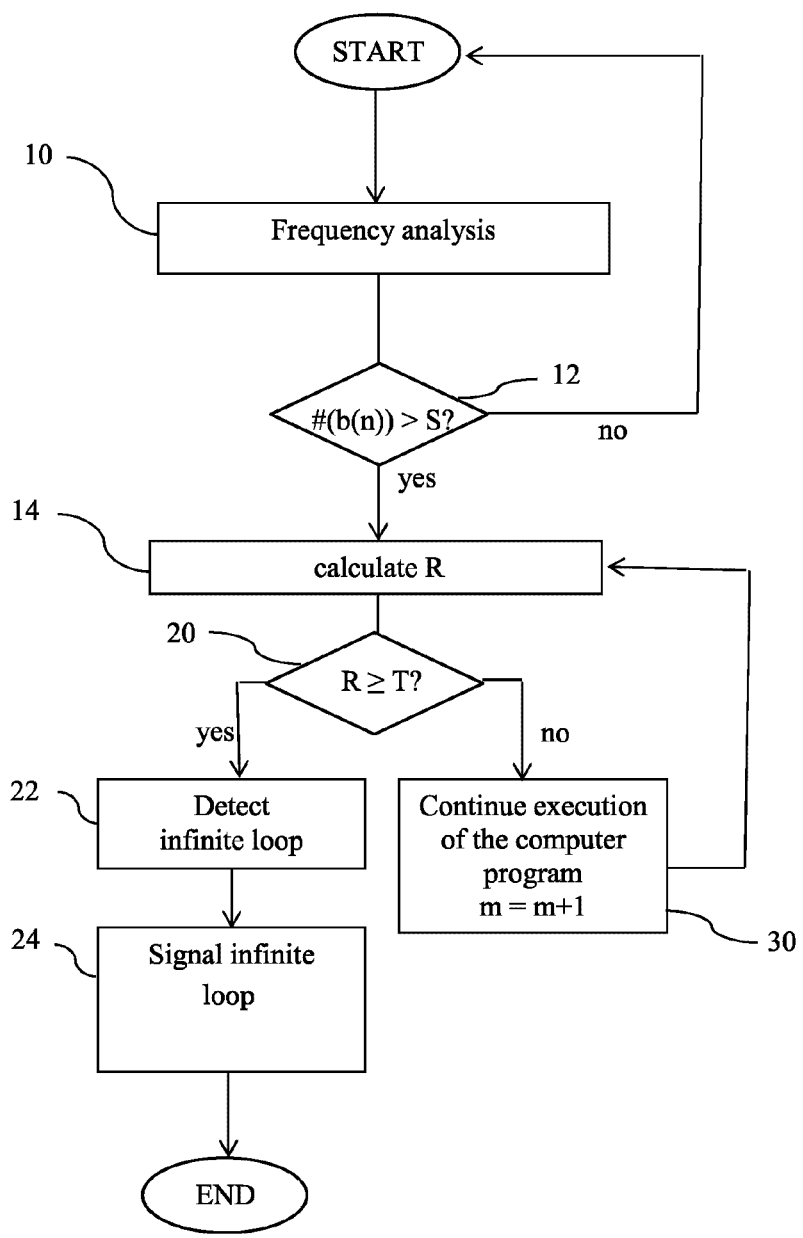

FIG. 4 shows a schematic view of the sequence of the detection method according to one embodiment of the invention.

Figure 5:
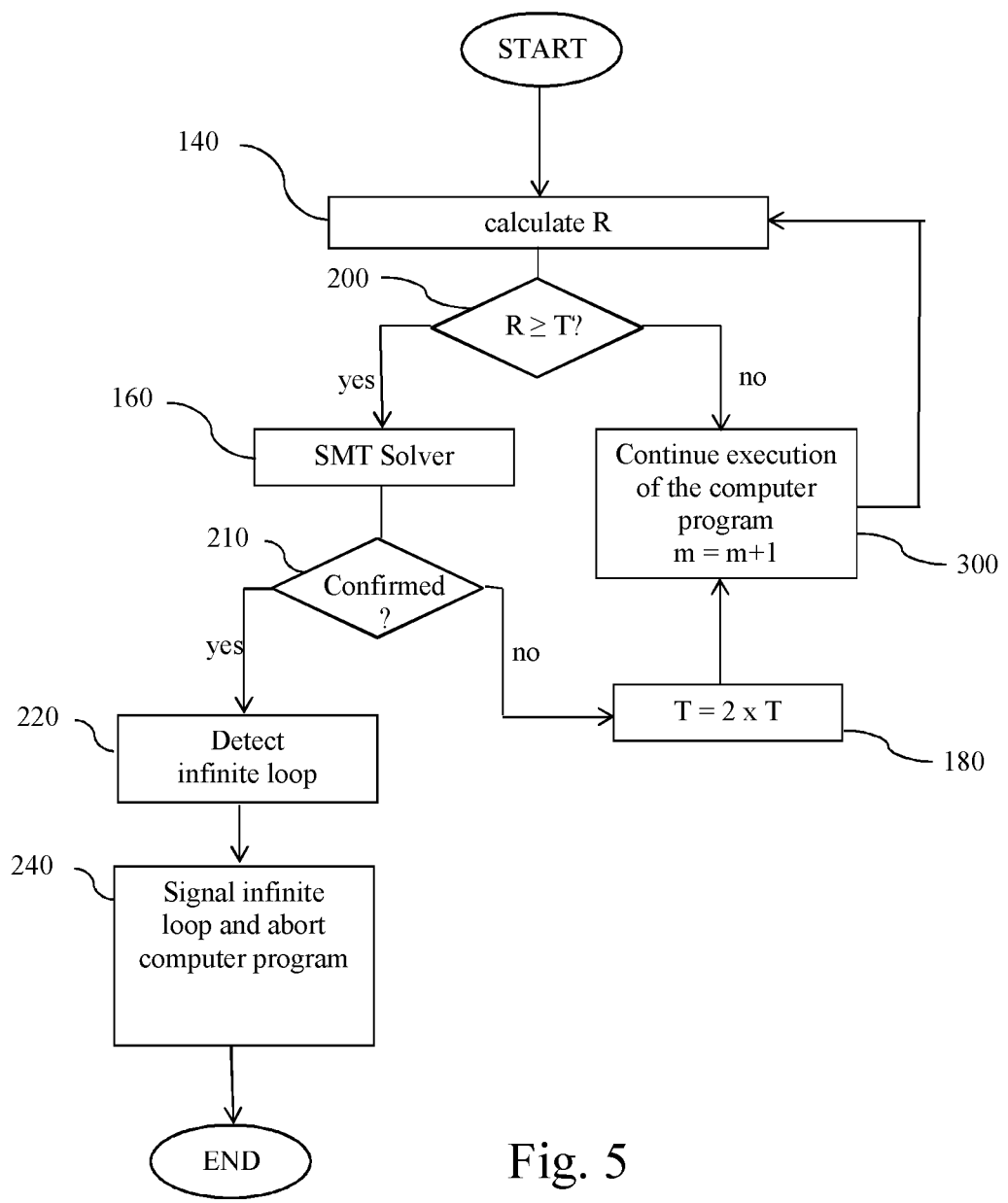

FIG. 5 shows a schematic view of the sequence of the detection method according to one embodiment of the invention.

Figure 6:
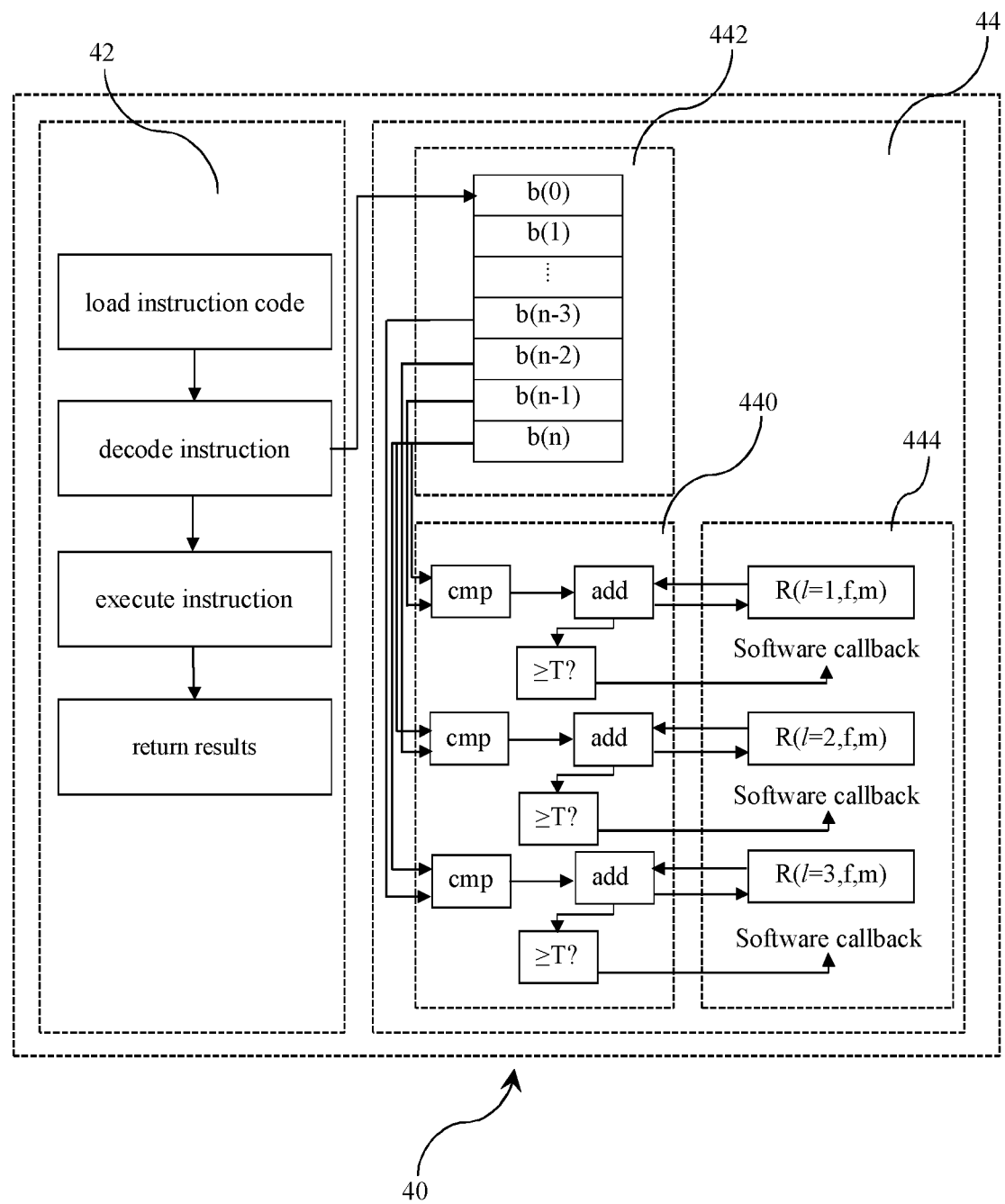

FIG. 6 shows a schematic view of the structure of the processor according to one embodiment of the invention.

DESCRIPTION OF THE PREFERRED EMBODIMENTS

Additional advantages and features of the invention are obtained from the following description, in which the invention is described on the basis of different exemplary embodiments and with reference to the attached drawings.

FIG. 1 shows the mathematical basis of the implementation of one embodiment of the method according to the invention. The method comprises the calculation of a detection function $R(l,m)$ of the branch addresses of the go-to instructions of the branch sequence of a computer program, wherein the branch sequence comprises a plurality of go-to instructions to be executed. In the example case shown, a branch sequence comprising 16 go-to instructions is considered, which are identified by the branch addresses $b(1)$ to $b(16)$. The branch addresses $b(1)$ to $b(16)$ are represented by numerical values by way of example. The numerical representation of the branch addresses is only intended to ease the understanding of the explanation and the identification of equal branch addresses. It should be noted, however, that a branch address does not necessarily correspond to a specific numerical value.

For example, both the branch address of the 4th go-to instruction of the branch sequence shown and that of the 9th go-to instruction are represented by the numerical value 4. This merely indicates that the branch addresses of the 4th and the 9th go-to instruction are equal, without any restriction regarding the actual functional aim thereof. Branch sequences occurring in practice normally comprise a much higher number of go-to instructions than 16.

FIG. 1A shows a recursive formula which is used for calculating the detection function $R(l, m)$. The detection function $R(l, m)$ depends on the integers l and m, where l represents a correlation length and m is the number of the go-to instructions executed by the computer program under consideration. On the basis of the recursive formula shown the detection function $R(l, m)$, which corresponds to the current execution state of the computer program, may be calculated from the detection function $R(l, m-1)$ of the immediately preceding branch sequence, i.e. the branch sequence that corresponded to the execution state of the computer program up to the execution of the go-to instruction which precedes the most recent go-to instruction.

According to the formula of FIG. 1A, the branch address $b(m)$ of the last executed go-to instruction is compared with the branch address $b(m-l)$ of the go-to instruction which was executed l go-to instructions before the go-to instruction identified by the branch address $b(m)$. If the branch address $b(m-l)$ of the branch address is equal to $b(m)$, the value of the detection function $R(l, m)$ is obtained from the value of the detection function $R(l, m-1)$, which is incremented by 1. Otherwise, the value of the detection function $R(l, m)$ is set to 0. Therefore the value of the detection function increases by 1 with each go-to instruction executed, as soon as at least one go-to instruction of the branch sequence begins to periodically repeat at least once every l go-to instructions and as long as the periodic repetition continues. The observation that the branch address b(m−1) is not equal to the branch address b(n) corresponds to the observation that the repetition of at least one section of the branch sequence has been interrupted. If this is the case, the value of the detection function R(l, m) is set to 0, so that the sum of the formula of FIG. 1A is started again.

As a result, an increased value of the detection function is in this case characteristic of an infinite loop in which at least one go-to instruction of the branch sequence is periodically repeated at least once every l go-to instructions. After each recalculation, the detection function R(l,m) is compared with a threshold value T. In this example case, a threshold value of T=10 is assumed for the sake of simplicity, although in reality the threshold value can be significantly higher than 10, in fact by several orders of magnitude. The existence of an infinite loop is detected if the detection function R(l,m) exceeds the threshold value T.

FIG. 1B shows values of the detection function for different correlation lengths. Each row of the table corresponds to the execution of a go-to instruction whose position in the branch sequence is shown in the first column of the table as the value n. It is important to note that the entirety of the 16 branch addresses shown may occur at any point of the complete branch sequence of the computer program. In particular, the branch address b(1), which is shown in the first row, may correspond to a go-to instruction that is only executed after the execution of a large number of previous go-to instructions.

The detection function R(l, m) is calculated for different values of the correlation length l, wherein the different values of the correlation length l are between 1 and a maximum correlation length L, which in the exemplary embodiment shown is L=5. The value of the maximum correlation length L can be varied during the execution of the method. The columns 3 to 7 of the table contain the values of the detection function R(l, m) calculated according to the formula of FIG. 1A, for each value of the correlation length l from 1 to 5.

The numerical values shown are intended to provide a clear presentation of the method according to the invention and represent all go-to instructions which have been executed. This does not mean, however, that it is essential to store all of the individual values of the detection function or the sequence of the go-to instructions. Rather, the detection function R(l, m) is calculated according to the recursive formula of FIG. 1A, so that only the temporary storage of the last l branch addresses and the last value of the detection function for all l is required.

As shown in columns 3 to 6 of the table, the value of the detection function R(l,m) always remains 0, i.e. no infinite loops are detected for values of the correlation length from l=1 to l=4. In the case of a correlation length l of 5 however, the value of the detection function R(l=5,m) increases by 1 after each execution of an instruction. After 3 iterations of the loop consisting of the go-to instructions that correspond to the numerical values 1 to 5 (cf. second column of the table), the detection function R(l=5,m) reaches the threshold T=10, so that the loop is detected as an infinite loop.

FIG. 2 shows the mathematical basis of the implementation of another embodiment of the method according to the invention. In this embodiment the detection function R(l,f, m) further depends on an offset coefficient f. In the example case shown, a branch sequence comprising 30 go-to instructions will now be considered. FIG. 2A shows the recursive formula which is used for the recursive calculation of the detection function R(l,f,m) from the detection function R(l, f,m−1). FIG. 2B shows values of the detection function R(l,f,m) for a correlation length l=5 and an offset coefficient f=0. The threshold value in this example case is set to T=5. From the table it can be seen that the detection function exceeds the threshold after the 5th periodic recurrence of the go-to instruction designated with the numerical value 5, although different go-to instructions are present between the repetitions of the go-to instruction in question.

The detection function is calculated for different values of the offset coefficient f FIG. 3 shows values of the detection functions for an offset coefficient f=2 and f=0 respectively. In exactly the same way as in FIG. 2, in the example case shown a periodic repetition of the go-to instruction designated with the numerical value 5 occurs, but not from the 5th go-to instruction of the branch sequence, but only from the 7th go-to instruction thereof. As a result, the presence of the infinite loop is not detected by the detection function calculated for a value f=0 of the offset coefficient. Nevertheless, the detection function which is calculated for a value f=2 of the offset coefficient can detect the infinite loop, which in this case occurs at the 32nd go-to instruction of the respective branch sequence at which the detection function exceeds the threshold value T=S.

FIG. 4 shows a schematic view of the sequence of one embodiment of the method according to the invention. The method includes a step 10, in which the execution frequency of all go-to instructions of the branch sequence under consideration, for example, the branch sequence of FIGS. 1 to 3, is determined. Only when the execution frequency of one of the go-to instructions exceeds a predetermined adjustable threshold value S is the corresponding detection function actually calculated (condition 12 in FIG. 4). In other words, the detection function R is calculated as explained above only under the condition that the number of repetitions of at least one go-to instruction exceeds the predetermined adjustable threshold value S. This takes place in method step 14 and may comprise the calculation of the detection function as explained in FIGS. 1 to 3. The method also comprises a step 20, in which the detection function is compared with the threshold value T. If the value of the detection function R is less than the threshold value T, the execution of the computer program is continued with method step 30. If the value of the detection function R exceeds or equals the threshold value T, an infinite loop is detected (step 22). Upon detection of an infinite loop, the existence of the infinite loop is signalled in method step 24, wherein the signalling comprises the transmission of information about the correlation length l and information about the branch address b(m) of the go-to instruction at which the loop was detected, and the method ends.

FIG. 5 shows a schematic view of the sequence of another possible embodiment of the method according to the invention. The method begins with the calculation 140 of the detection function and proceeds with the method step 200, in which the value of the detection function is compared with the threshold value T. In this case, if the threshold value T is exceeded, an infinite loop is not detected and signalled straightforwardly. Instead, the method comprises a step 160, in which the authenticity of the putative infinite loop following the method step 200 is checked by executing an SMT (Satisfiability modulo theory) test. If this test step 210) produces a negative result, i.e. if the hypothesis of the presence of an actual infinite loop is refuted, the threshold value is doubled at step 180, so that other such false alarms can be avoided. The execution of the computer program is then continued in method step 300. If the SMT test produces a positive result at step 210, i.e., if the suspicion of the presence of an actual infinite loop is confirmed, then an infinite loop is detected at method step 220. At this point, at method step 240 the now confirmed infinite loop is signalled and the execution of the program is aborted.

FIG. 6 shows the structure of a processor 40 according to one of the embodiments of the invention. The processor 40 comprises an execution unit 42 and a detection unit 44. The execution unit 42 and the detection unit 44 are functionally connected to each other. The detection unit 44 comprises a first memory 442 and a second memory 444.

The execution unit 42 is configured to execute computer programs in accordance with a conventional fetch-decode-execute-writeback cycle. Firstly, the instruction code is loaded, i.e. the execution unit 42 retrieves the instruction of the computer program to be executed, which it stores in an internal temporary register. After that, the decoding step is executed, in which the execution unit 42 decodes, i.e. interprets, the retrieved instruction to be executed. The decoded instruction is then executed and finally, the results obtained from the executed instruction are registered.

After the decoding step, the memory address of the instruction to be executed can be identified and it can then be determined whether it is a go-to instruction or a branch address. If this is the case, the execution unit 42 enters the branch address of the decoded go-to instruction into the first memory 442 of the detection unit, so that this address can be taken into account in the detection analysis in the detection unit.

The detection unit 44 is configured to detect infinite loops during the execution of the computer program in the execution unit 42 by the calculation of a detection function of the branch addresses of a branch sequence of the computer program. For this purpose the detection unit 44 comprises a detection logic structure 440 comprising logical circuits, which allows a hardware-based implementation of the detection analysis according to the invention. The detection logic structure 440 allows for the calculation of a detection function $R(l,m)$ recursively from the preceding detection function $R(l,m-1)$ according to the formula $$R(l,m)=R(l,m-1)+\delta(b(m),b(m-1))$$

for three different values of the correlation length, $l=1$, $l=2$ and $l=3$. As shown in the figure, for each of the three values of the correlation length, the branch address $b(n)$ of the current go-to instruction is compared with the corresponding branch address of an earlier go-to instruction, i.e. with the branch addresses $b(n-1)$, $b(n-2)$, or $b(n-3)$. The comparison corresponds to the calculation of the Kronecker delta function $\delta(b(m), b(m-1))$, and is indicated in the figure by the label "cmp" (compare). The result of the comparison is a correlation value, which is 1 if the branch address $b(n)$ and the corresponding branch address compared to it $b(n-1)$, $b(n-2)$ or $b(n-3)$ are equal, and is 0 otherwise, and this correlation value is added to the current value of the corresponding detection function, i.e. $R(l=1,f,m)$, $R(l=2,f,m)$, or $R(l=3,f,m)$, which is stored in the second memory 444.

After that, the new value of the detection function is stored in the second memory 444 and compared with the threshold value T. If the newly calculated value of the detection function exceeds the threshold value T, the abortion of the execution of the computer program is initiated by a software call-back instruction.

Preferred exemplary embodiments of the invention have been explained in the preceding description and in the attached figures. It is important to note that these examples are in no way meant to represent a limitation of the present invention. Rather, all modifications of the same are hereby claimed, and are included within the scope of protection of the claims either at present or in future.

LIST OF REFERENCE NUMERALS

40 processor
42 execution unit
44 detection unit
440 detection logic structure
442, 444 memory

The invention claimed is:

1. A processor comprising an execution unit and a detection unit that are functionally connected, wherein the execution unit is configured to execute computer programs, and wherein the detection unit is configured to detect infinite loops during execution of a computer program in the execution unit during a run-time of said computer program;
   wherein the computer program comprises a plurality of go-to instructions,
   wherein each go-to instruction is characterized by a corresponding branch address;
   wherein the detection unit is configured to calculate a detection function,
   wherein the detection function is a function of branch addresses of a branch sequence, wherein the branch sequence comprises a sequence of executed go-to instructions; and
   wherein the detection function is such that an increased value of the detection function is characteristic of an infinite loop in which at least one go-to instruction is repeated, such that the detection function assumes a higher value in case of existence of an infinite loop than when no infinite loop is present.

2. The processor according to claim 1, wherein the detection unit is further configured to compare a value of the detection function with a threshold value in order to detect said existence of an infinite loop, wherein said existence of an infinite loop is detected if said value of the detection function exceeds the threshold value.

3. The processor according to claim 1, wherein the detection function depends on an integer l which represents a correlation length, and wherein the detection function is such that said increased value of the detection function for a given correlation length l is characteristic of an infinite loop in a branch sequence, in which at least one go-to instruction is repeated at least once every l go-to instructions.

4. The processor according to claim 3, wherein the detection unit is configured to calculate said detection function as a function $R(l, m)$ according to $$R(l, m) = \sum_{n=1}^{m} \delta(b(n), b(n - l))$$

where m, n, and l are integers, l is said correlation length, m is a number of executed go-to instructions, b(n) and b(n-l) are respectively the branch addresses of an n-th and an (n-l)-th executed go-to instruction, and where $\delta$ is a Kronecker delta function, defined as follows:

$$\delta(i, j) = \begin{cases} 1 \text{ for } i = j \\ 0 \text{ for } i \neq j \end{cases}.$$

5. The processor according to claim 1, wherein said detection function also depends on an integer m, where m is a number of executed go-to instructions.

6. The processor according to claim 1, wherein said detection function comprises a sum of correlation values, wherein a correlation value is or corresponds to a number that is assigned, by the detection unit, to a pair of branch addresses of the branch sequence.

7. The processor according to claim 6, wherein the detection unit is configured to assign a higher correlation value, in particular a correlation value of 1, to said pair of branch addresses if branch addresses of said pair of branch addresses are identical, and to assign a lower correlation value, in particular a correlation value of 0, to said pair of branch addresses if branch addresses of said pair of branch addresses are not identical.

8. The processor according to claim 1, wherein said increased value of the detection function is characteristic of an infinite loop, in which at least one go-to instruction is repeated periodically at least once every l go-to instructions.

9. The processor according to claim 1, wherein the detection unit is configured to calculate the detection function recursively from a preceding detection function, wherein a preceding detection function is said detection function evaluated for a preceding branch sequence.

10. The processor according to claim 9, wherein the detection unit is configured to calculate said detection function as a function R(l, m) recursively from a preceding detection function R(l, m−1) according to $$R(l,m) = R(l,m-1) + \delta(b(m), b(m-l))$$

wherein R(l, m−1) is a detection function of an immediately preceding branch sequence, l is a correlation length, wherein said detection function is such that said increased value of said detection function for a given correlation length l is characteristic of an infinite loop in a branch sequence, in which at least one go-to instruction is repeated at least once every l go-to instructions, wherein m is a number of executed go-to instructions, b(m) is the branch address of a last executed go-to instruction, and b(m−l) is the branch address of a go-to instruction executed a number of go-to instructions before said last executed go-to instruction, said number corresponding to the correlation length l, and where δ is a Kronecker delta function, defined as follows:

$$\delta(i, j) = \begin{cases} 1 & \text{for } i = j \\ 0 & \text{for } i \neq j \end{cases}.$$

11. The processor according to claim 1, wherein the detection function is such that during execution of a go-to instruction which interrupts a periodic repetition of at least one go-to instruction, the detection function assumes an output value, in particular a value of 0.

12. The processor according to claim 11, wherein the detection unit is configured to calculate said detection function as a function R(l, m) recursively from a function R(l, m−1) according to $$R(l, m) = \begin{cases} R(l, m-1) + 1 & \text{for } b(m) = b(m-l) \\ 0 & \text{otherwise} \end{cases}$$

wherein R(l, m−1) is a detection function of an immediately preceding branch sequence, l is a correlation length, wherein said detection function is such that said increased value of said detection function for a given correlation length l is characteristic of an infinite loop in a branch sequence, in which at least one go-to instruction is repeated at least once every l go-to instructions, wherein m is a number of executed go-to instructions, b(m) is the branch address of a last executed go-to instruction, and b(m−l) is the branch address of a go-to instruction executed a number of go-to instructions before said last executed go-to instruction, said number corresponding to said correlation length l.

13. The processor according to claim 11, wherein the detection unit is configured to calculate said detection function as a function R(l, f, m) which additionally depends on an offset coefficient f, and to calculate the function R(l, f, m) recursively from a function R(l, f, m−1) according to $$R(l, f, m) = \begin{cases} R(l, f, m-1) & \text{for } f \neq m \bmod l \\ R(l, f, m-1) + 1 & \text{for } f = m \bmod l \text{ and } b(m) = b(m-l) \\ 0 & \text{for } f = m \bmod l \text{ and } b(m) \neq b(m-l) \end{cases}$$

wherein R(l, f, m−1) is a detection function of an immediately preceding branch sequence, l is a correlation length, wherein said detection function is such that said increased value of said detection function for a given correlation length l is characteristic of an infinite loop in a branch sequence, in which at least one go-to instruction is repeated at least once every l go-to instructions, wherein m is a number of executed go-to instructions, b(m) is a branch address of a last executed go-to instruction, and b(m−l) is a branch address of a go-to instruction that was executed a number of go-to instructions before said last executed go-to instruction, said number corresponding to the correlation length l.

14. The processor according to claim 13, wherein the detection unit is configured to calculate said function R(l, f, m) for different values of said offset coefficient f, wherein for a value of said correlation length l, the different values of said offset coefficient f are between 0 and l−1, where l is the value of said correlation length.

15. The processor according to claim 1, wherein the detection unit is configured to calculate said detection function for different values of a correlation length l, wherein said detection function is such that said increased value of said detection function for a given correlation length l is characteristic of an infinite loop in a branch sequence, in which at least one go-to instruction is repeated at least once every l go-to instructions, wherein the different values of the correlation length l are between 1 and a maximum correlation length L.

16. The processor according to claim 1, wherein the execution unit is configured to carry out a logical satisfiability test in order to check a validity of a putative infinite loop detected by the detection unit.

17. The processor according to claim 1, wherein the execution unit or the detection unit is further configured to determine a frequency of execution of at least one go-to instruction of the branch sequence, wherein the detection function is calculated by the detection unit only if the execution frequency of the at least one go-to instruction exceeds a predetermined adjustable threshold value S.

18. The processor according to claim 1, wherein the detection unit comprises a memory, which is configured to store values of parameters of said detection function, and/or a threshold value, and/or values of said detection function.

19. The processor according to claim 18, wherein the memory or an additional memory is configured to store branch addresses of the branch sequence.

20. The processor according to claim 1, wherein the execution unit is configured to interrupt or abort execution of said computer program upon detection of an infinite loop by means of the detection unit.

21. The processor according to claim 1, further comprising a processor interface comprising instructions for reading and/or writing values of at least one parameter of the detection function, and/or a threshold value and/or values of the detection function.

22. A method for detecting infinite loops in an execution of a computer program during a run-time of the computer program, wherein the computer program comprises a plurality of go-to instructions, wherein each go-to instruction is characterized by a corresponding branch address, wherein the method comprises calculating a detection function, wherein the detection function is a function of branch addresses of a branch sequence, wherein the branch sequence comprises a sequence of executed go-to instructions, wherein the detection function is such that an increased value of the detection function is characteristic of an infinite loop in which at least one go-to instruction is repeated, such that the detection function assumes a higher value in case of existence of an infinite loop than when no infinite loop is present.

23. The method according to claim 22, further comprising a step in which a value of the detection function is compared with a threshold value, and an existence of an infinite loop is detected if said value of the detection function exceeds the threshold value.

24. The method according to claim 22, wherein the detection function depends on an integer l which represents a correlation length, and wherein the detection function is such that said increased value of the detection function for a given correlation length l is characteristic of an infinite loop in a branch sequence, in which at least one go-to instruction is repeated at least once every l go-to instructions.

25. The method according to claim 22, wherein the detection function further depends on an integer m, where m is a number of executed go-to instructions.

26. The method according to claim 22, wherein the calculation of the detection function comprises the calculation of a sum of correlation values, wherein a correlation value is or corresponds to a number that is assigned to a pair of branch addresses of the branch sequence.

27. The method according to claim 26, wherein a higher correlation value, in particular a correlation value of 1, is assigned to said pair of branch addresses if branch addresses of said pair of branch addresses are identical, and a lower correlation value, in particular a correlation value of 0, is assigned to said pair of branch addresses if branch addresses of said pair of branch addresses are not identical.

28. The method according to claim 22, wherein said increased value of the detection function is characteristic of an infinite loop in which at least one go-to instruction is repeated periodically at least once every l go-to instructions.

29. The method according to claim 22, wherein the detection function is calculated as a function R(l, m) according to $$R(l, m) = \sum_{n=1}^{m} \delta(b(n), b(n-l))$$

where m, n, and l are integers, l is said correlation length, m is a number of executed go-to instructions, b(n) and b(n-l) are respectively the branch addresses of an n-th and an (n-l)-th executed go-to instruction, and where δ is a Kronecker delta function, which is defined as follows:

$$\delta(i, j) = \begin{cases} 1 \text{ for } i = j \\ 0 \text{ for } i \neq j \end{cases}.$$

30. The method according to claim 22, wherein the detection function is calculated recursively from a preceding detection function, wherein a preceding detection function is said detection function evaluated for a preceding branch sequence.

31. The method according to claim 30, wherein said detection function is calculated recursively as a function R(l, m) from a preceding detection function R(l, m−1) according to $$R(l,m)=R(l,m-1)+\delta(b(m),b(m-l))$$

wherein R(l, m−1) is a detection function of an immediately preceding branch sequence, l is a correlation length, wherein said detection function is such that said increased value of said detection function for a given correlation length l is characteristic of an infinite loop in a branch sequence, in which at least one go-to instruction is repeated at least once every l go-to instructions, wherein m is a number of executed go-to instructions, b(m) is the branch address of a last executed go-to instruction, and b(m−l) is the branch address of a go-to instruction executed a number of go-to instructions before said last executed go-to instruction, said number corresponding to the correlation length l, and where δ is a Kronecker delta function, which is defined as follows:

$$\delta(i, j) = \begin{cases} 1 \text{ for } i = j \\ 0 \text{ for } i \neq j \end{cases}.$$

32. The method according to claim 22, wherein the detection function is such that, during execution of a go-to instruction which interrupts a periodic repetition of at least one go-to instruction, the detection function assumes an output value, in particular a value of 0.

33. The method according to claim 32, wherein said detection function is calculated recursively as a function R(l, m) from a function R(l, m−1) according to $$R(l, m) = \begin{cases} R(l, m-1) + 1 & \text{for } b(m) = b(m-l) \\ 0 & \text{otherwise} \end{cases}.$$

wherein R(l, m−1) is a detection function of an immediately preceding branch sequence, l is a correlation length, wherein said detection function is such that said increased value of said detection function for a given correlation length l is characteristic of an infinite loop in a branch sequence, in which at least one go-to instruction is repeated at least once every l go-to instructions, wherein m is a number of executed go-to instructions, b(m) is the branch address of a last executed go-to instruction, and b(m−l) is the branch address of a go-to instruction executed a number of go-to instructions before said last executed go-to instruction, said number corresponding to said correlation length l.

34. The method according to claim 32, wherein said detection function is a function R(l, f, m) further depending on an offset coefficient f, and wherein the function R(l, f, m) is calculated recursively from a function R(l, f, m−1) in accordance with $$R(l, f, m) = \begin{cases} R(l, f, m-1) & \text{for } f \neq m \bmod l \\ R(l, f, m-1) + 1 & \text{for } f = m \bmod l \text{ and } b(m) = b(m-l) \\ 0 & \text{for } f = m \bmod l \text{ and } b(m) \neq b(m-l) \end{cases}$$

wherein R(l, f, m−1) is a detection function of an immediately preceding branch sequence, l is a correlation length, wherein said detection function is such that said increased value of said detection function for a given correlation length l is characteristic of an infinite loop in a branch sequence, in which at least one go-to instruction is repeated at least once every l go-to instructions, wherein m is a number of executed go-to instructions, b(m) is a branch address of a last executed go-to instruction, and b(m−l) is a branch address of a go-to instruction that would be executed a number of go-to instructions before said last executed go-to instruction, said number corresponding to the correlation length l.

35. The method according to claim 34, wherein said function R(l, f, m) is calculated for different values of said offset coefficient f, wherein the different values of the offset coefficient f are between 0 and a maximum offset coefficient F.

36. The method according to claim 22, wherein the detection function is calculated for different values of a correlation length l, wherein said detection function is such that said increased value of said detection function for a given correlation length l is characteristic of an infinite loop in a branch sequence, in which at least one go-to instruction is repeated at least once every l go-to instructions, wherein the different values of the correlation length l are between 1 and a maximum correlation length L.

37. The method according to claim 22, wherein upon detection of an infinite loop an existence of the loop is reported, wherein the reporting comprises a transmission of information about a correlation length l, wherein said detection function is such that said increased value of said detection function for a given correlation length l is characteristic of an infinite loop in a branch sequence, in which at least one go-to instruction is repeated at least once every l go-to instructions, and/or transmission of information about a go-to instruction at which the infinite loop was detected, or transmission of information about a branch address b(m) of said go-to instruction at which the infinite loop was detected.

38. The method according to claim 22, further comprising a step in which a validity of a putative infinite loop to be detected is verified by execution of said putative infinite loop to be detected while carrying out a logical satisfiability test.

39. A non-transitory computer-readable storage medium which stores a computer program product which comprises software code for implementing the method of claim 22.

* * * * *